United States Patent [19]
Kretchman et al.

[11] Patent Number: 6,004,596
[45] Date of Patent: Dec. 21, 1999

[54] SEALED CRUSTLESS SANDWICH

[75] Inventors: Len C. Kretchman, Fergus Falls, Minn.; David Geske, Fargo, N. Dak.

[73] Assignee: Menusaver, Inc., Orrville, Ohio

[21] Appl. No.: 08/986,581

[22] Filed: Dec. 8, 1997

[51] Int. Cl.[6] .................................................. A21D 13/00
[52] U.S. Cl. ......................... 426/94; 426/274; 426/275; 426/297
[58] Field of Search ............................ 426/94, 274, 275, 426/297, 138

[56] References Cited

U.S. PATENT DOCUMENTS

| | | | |
|---|---|---|---|
| 3,083,651 | 4/1963 | Cooper | 426/275 |
| 3,690,898 | 9/1972 | Partyka | 426/275 |
| 3,767,823 | 10/1973 | Wheeler et al. | 426/275 |
| 3,769,035 | 10/1973 | Kleiner et al. | 426/275 |
| 3,862,344 | 1/1975 | Zobel | 426/244 |
| 4,382,768 | 5/1983 | Lifshitz et al. | 426/275 |
| 5,853,778 | 12/1998 | Mayfield | 426/89 |

OTHER PUBLICATIONS

"50 Great Sandwiches", Carole Handslip, pp. 81–84,86,95, 1994.

*Primary Examiner*—Lien Tran
*Attorney, Agent, or Firm*—Vickers, Daniels & Young

[57] ABSTRACT

A sealed crustless sandwich for providing a convenient sandwich without an outer crust which can be stored for long periods of time without a central filling from leaking outwardly. The sandwich includes a lower bread portion, an upper bread portion, an upper filling and a lower filling between the lower and upper bread portions, a center filling sealed between the upper and lower fillings, and a crimped edge along an outer perimeter of the bread portions for sealing the fillings therebetween. The upper and lower fillings are preferably comprised of peanut butter and the center filling is comprised of at least jelly. The center filling is prevented from radiating outwardly into and through the bread portions from the surrounding peanut butter.

10 Claims, 4 Drawing Sheets

SEALED CRUSTLESS SANDWICH

BACKGROUND OF THE INVENTION

1. Field of the Invention

The present invention relates generally to sandwiches and more specifically it relates to a sealed crustless sandwich for providing a convenient sandwich without an outer crust which can be stored for long periods of time without a central filling from leaking outwardly.

Many individuals enjoy sandwiches with meat or jelly like fillings between two conventional slices of bread. However, some individuals do not enjoy the outer crust associated with the conventional slices of bread and therefore take the time to tear away the outer crust from the desired soft inner portions of the bread. This outer crust portion is then thrown away and wasted. There is currently no method or device for baking bread without having an outer crust. Hence, there is a need for a convenient sandwich which does not have an outer crust and which is not prone to waste of the edible outer crust portions. The present invention provides a method of making a sealed crustless sandwich which can be stored for extended periods of time without an inner filling from seeping into the bread portion.

2. Description of the Prior Art

There are numerous sandwich devices. For example, U.S. Pat. No. 3,690,898 to Partyka; U.S. Design Pat. No. 252,536 to Goglanian; U.S. Design Pat. No. 293,040 to Gagliardi; U.S. Design Pat. No. 317,672 to Presl; U.S. Design Pat. No. 318,360 to Sam; and U.S. Pat. No. 5,500,234 to Russo all of which are illustrative of such prior art.

While these sandwiches may be suitable for the particular purpose to which they address, they are not as suitable for providing a convenient sandwich without an outer crust which can be stored for long periods of time without a central filling from leaking outwardly. The prior art does not teach a sandwich without an outer crust which sealably retains an inner filling for extended periods of time.

In these respects, the sealed crustless sandwich according to the present invention substantially departs from the conventional concepts and designs of the prior art, and in so doing provides a sandwich primarily developed for the purpose of providing a convenient sandwich without an outer crust which can be stored for long periods of time without a central filling from leaking outwardly.

SUMMARY OF THE INVENTION

A primary object of the present invention is to provide a sealed crustless sandwich that will overcome the shortcomings of the prior art devices.

Another object is to provide a sealed crustless sandwich that does not have any crust.

An additional object is to provide a sealed crustless sandwich that retains an inner filling from seeping into the bread portion.

A further object is to provide a sealed crustless sandwich that can be stored for extended periods of time for use in lunch box type of situations.

Another object is to provide a sealed crustless sandwich that reduces the amount of wasted bread because of thrown away crust portions.

Another object is to provide a method of producing a sealed crustless sandwich.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 1 is a side view of cutting cylinder above the upper and lower bread with the fillings in between.

FIG. 2 is a side view of the cutting cylinder penetrating and crimping the upper and lower bread with the fillings in between.

FIG. 4 is a cross sectional view from FIG. 3 disclosing the peanut butter sealing the jelly in between.

DESCRIPTION OF THE PREFERRED EMBODIMENT

Figure 1:
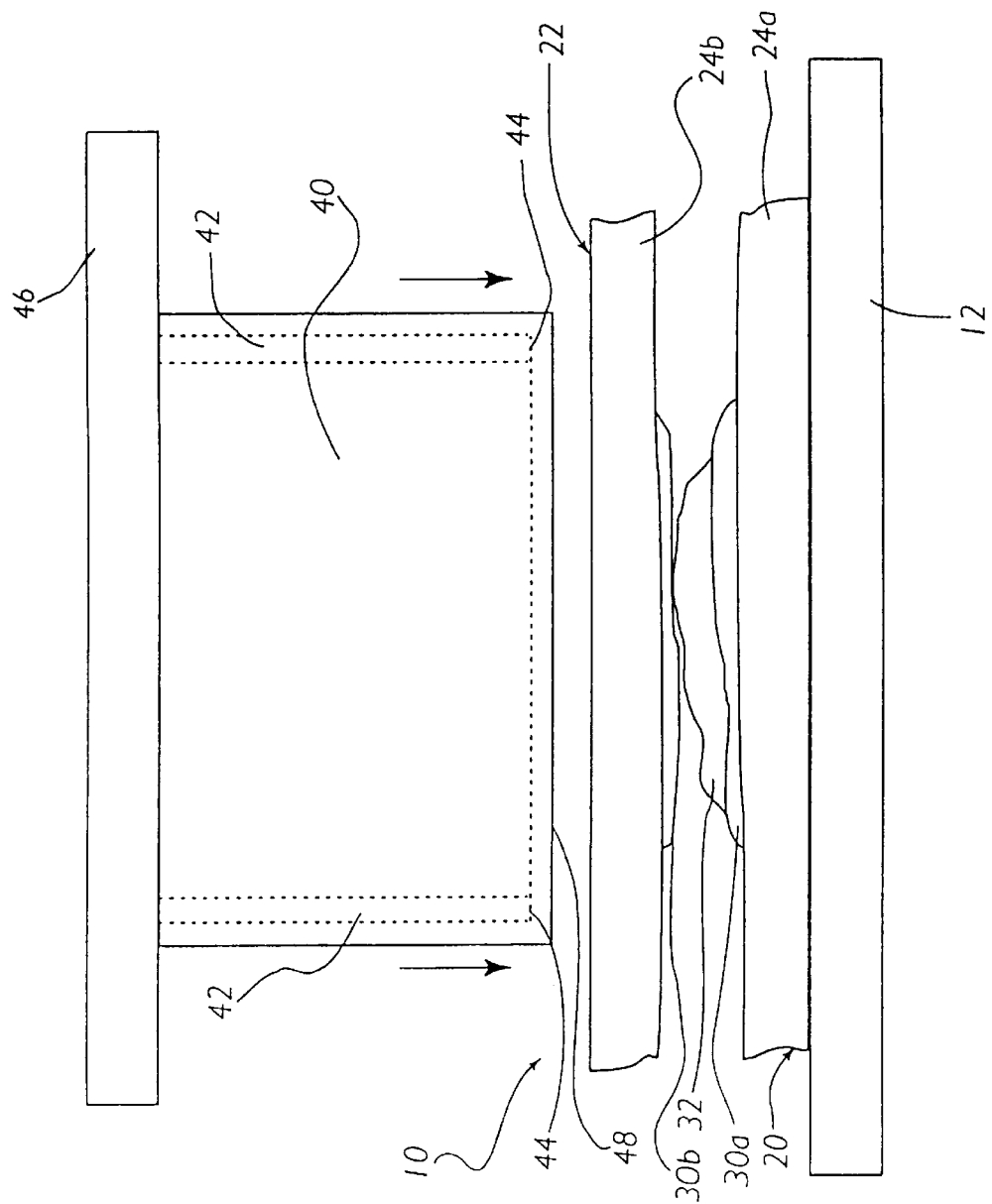

Turning now descriptively to the drawings, in which similar reference characters denote similar elements throughout the several view, FIGS. 1 through 5 illustrate a sealed crustless sandwich 10, which generally comprises lower bread portion 20, an upper bread portion 22, an upper filling 30b and a lower filing 30a between the lower bread portion 20 and upper bread portion 22, a center fillng 32 sealed between the upper filling 30b and the lower filling 30a, and a crimped edge 26 along an outer perimeter of the bread portions 20, 22 for sealing the fillings 30a–b, 32 therebetween. The upper filing 30b and the lower filling 30a are preferably comprised of peanut butter but may consist of any other edible substance such as but not limited to meat, vegetable oil, jelly, cheese, honey, or fruit. The center filling 32 is preferably comprised of jelly but may consist of any other edible substance such as but not limited to meat, vegetable oil, jelly, cheese, honey, or fruit. The center filling 32 is prevented from leaking outwardly into and through the bread portions 20, 22 from the surrounding upper filling 30b and lower filling 30a. The sealed crustless sandwich is preferably packaged within a resilient packaging 14 to extend its useful life and for providing convenience for the user.

Figure 2:
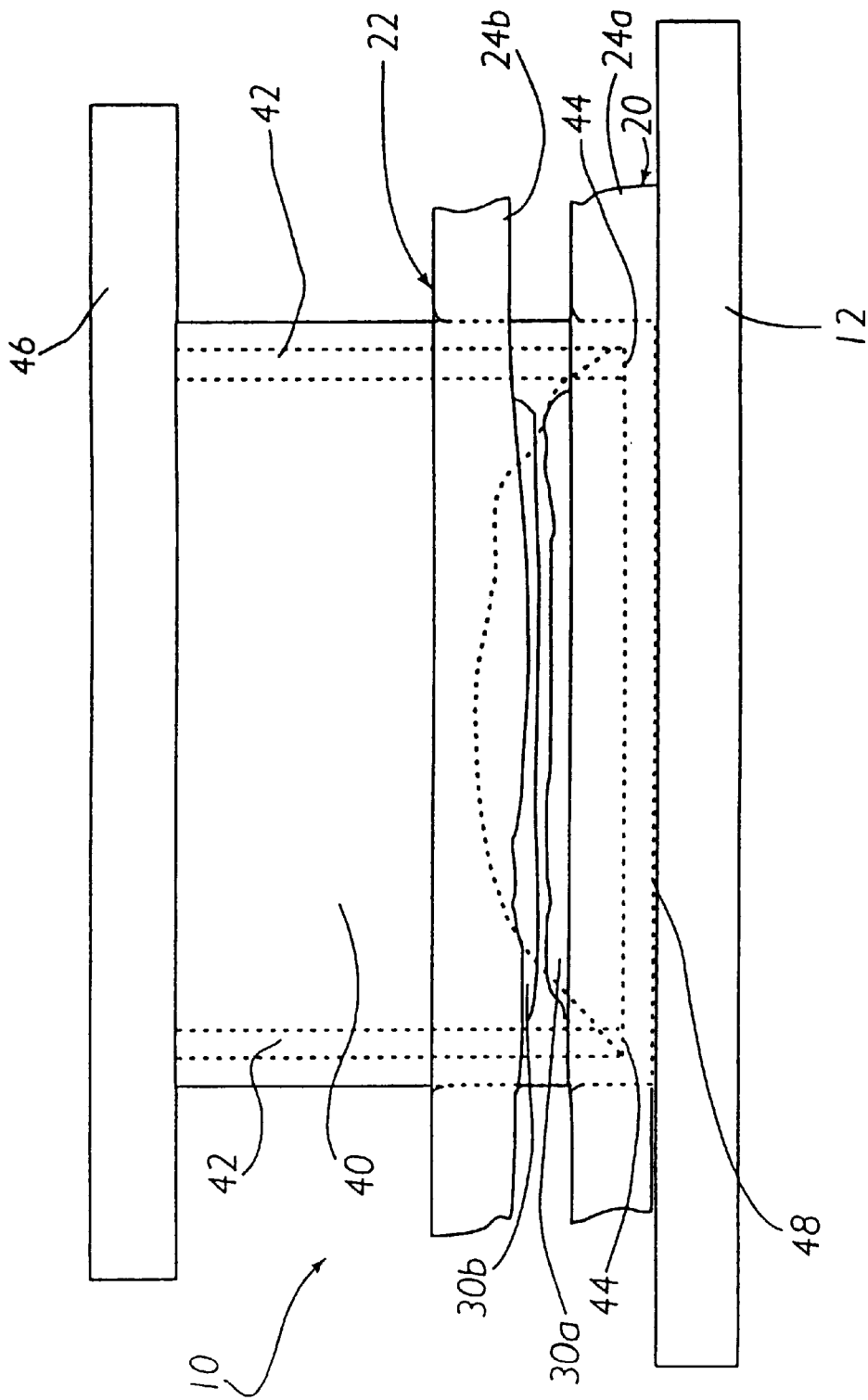
Figure 3:
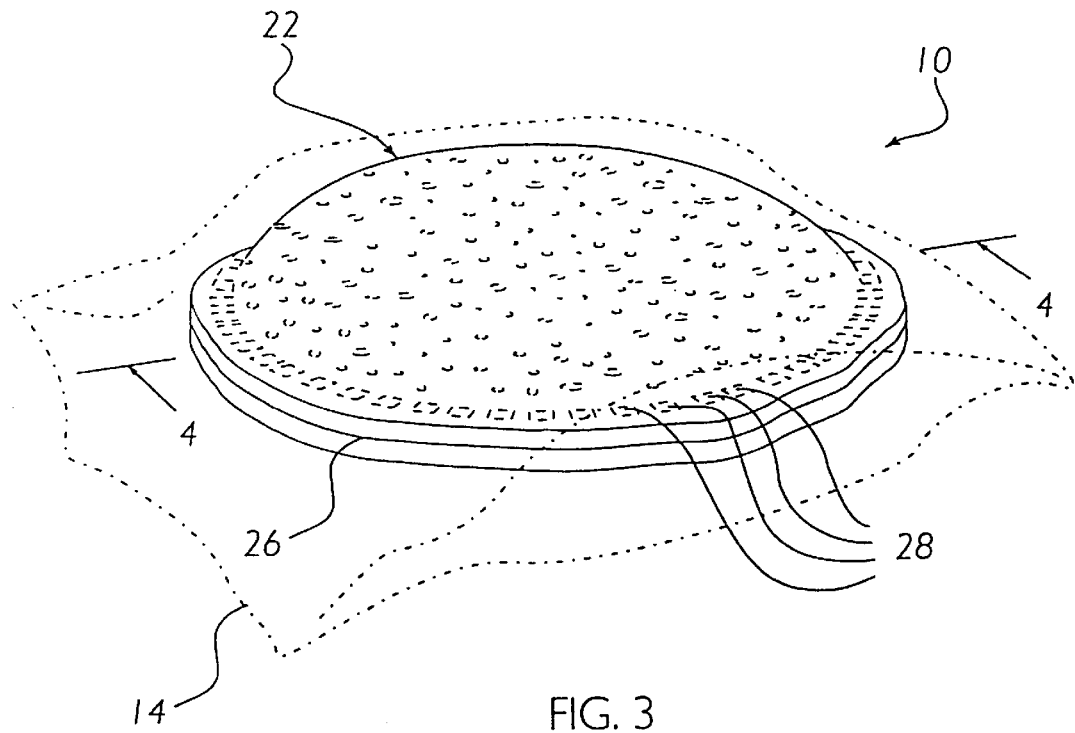
FIG. 3 is an upper perspective view of the sealed crustless sandwich within an airtight packaging.
Figure 5:
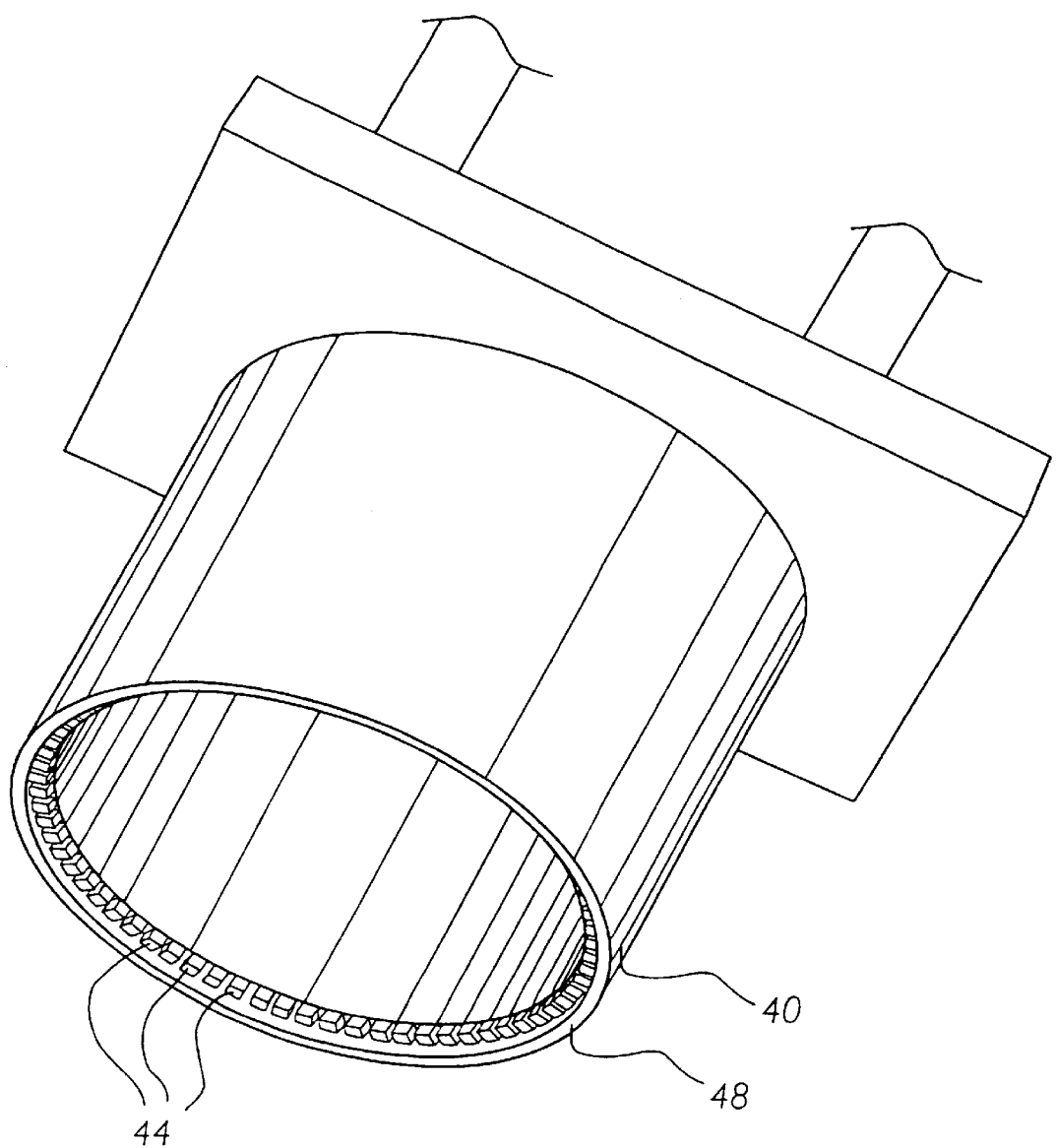
FIG. 5 is a lower perspective view of the cutting cylinder.

As shown in FIGS. 1, 2 and 5 of the drawings, a cutting cylinder 40 has a sleeve 42 positioned within. The sleeve 42 preferably is sidably positioned within a lumen of the cutting cylinder 40, but may be secured within the cutting cylinder 40. The bottom edge of the sleeve 42 has a notched end 44 with the notches spaced approximately every ⅛ inch. The plurality of extensions created from the plurality of notches forms a corresponding plurality of depressions 28 in the crimped edge 26 which represent the pressure points where extensions have projected into the bread portions 20, 22. A cutting edge 48 of the cutting cylinder 40 is utilized to penetrate through the bread portions 20, 22 as shown in FIG. 2 of the drawings. The cutting edge 48 may be formed into various shapes to form a unique design for the sealed crustless sandwich 10. The notched edge of the sleeve 42 compresses the upper bread portion 22 into the lower bread portion 20 to form a seal which retains itself for extended periods of time. A support member 46 or similar structure is attached to the cutting cylinder 40 and the sleeve 42 as shown in FIGS. 1, 2 and 5, wherein the support member 46 is attached to an elevating/descending means for operating the cutting cylinder 40.

Figure 4:
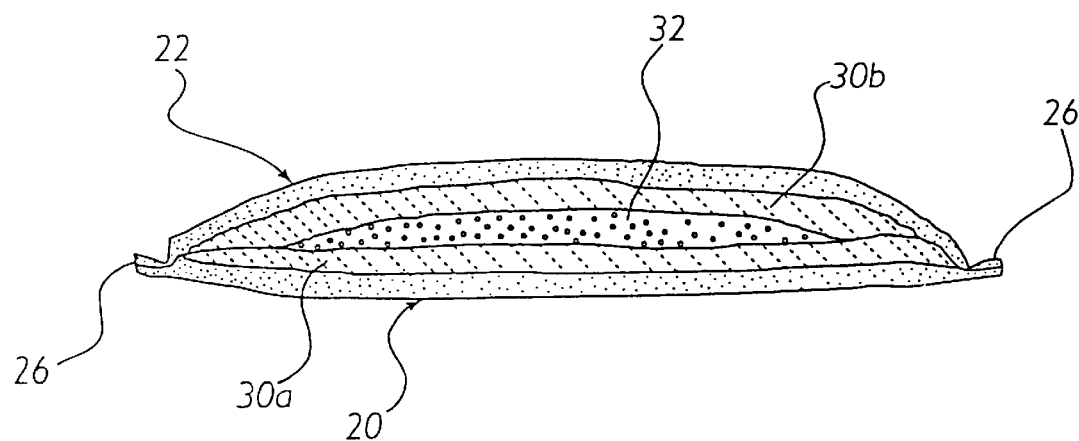

As best shown in FIG. 4, the upper filling 30b is juxtaposed to a lower surface of the upper bread portion 22. The lower filling 30a is juxtaposed to an upper surface of the lower bread portion 20. Preferably, the upper filling 30b and the lower filling 30a do not extend into the crimped edge 26 since any foreign substance within the crimped edge 26 weakens the seal between the lower and upper bread portions 20, 22. The center filling 32 is positioned and sealed between the upper filling 30b and the lower filling 30a as shown in FIG. 4 of the drawings. The crimped edge 26 preferably has a plurality of depressions 28 formed into from the pressure points caused by the notched end 44 of the sleeve 42. The depressions 28 prevent the crimped edge 26 from separating thereby retaining the fillings 30a–b, 32 within.

In use, the upper surface of the lower bread portion 20 is partially covered with the lower filling 30a over a defined area. The defined area is preferably inside of an inner perimeter of the sleeve 42 so as to eliminate or reduce the amount of lower filling 30a within the crimped edge 26. The center filling 32 is positioned centrally onto the lower filling 30a as shown in FIG. 1 of the drawings. The lower surface of the upper bread portion 22 is partially covered with the upper filling 30b over an area substantially equal to the defined area of the lower filling 30a. The upper bread portion 22 is positioned above the lower bread portion 20 with the upper filling 30b juxtaposed to the center filling 32 and the lower filling 30a. The cutting cylinder 40 is descended onto the upper bread portion 22 as shown in FIG. 1 of the drawings. The cutting cylinder 40 penetrates the bread portions 20, 22 so cut out circular portion surrounding the fillings 30a–b, 32. The sleeve 42 is simultaneously descended onto the upper bread portion 22 whereby the notched end 44 engages the upper bread portion 22. The notched end 44 forces the circular portion of the upper bread portion 22 onto the corresponding circular portion of the lower bread portion 20 thereafter crimping the bread portions 20, 22 between the notched end 44 and a plate 12 supporting the lower bread portion 20 as shown in FIG. 2 of the drawings. Simultaneously during the crimping, the upper filling 30b is forced into the lower filling 30a surrounding the center filling 32, thereby sealing the center filling 32 therebetween. The cutting cylinder 40 and the sleeve 42 are elevated away from the sealed crustless sandwich 10 while pressurized air is released into the cutting cylinder 40 to help force the sealed crustless sandwich 10 out from within. The crust 24 portion of the upper and lower bread portions 20, 22 is hence removed from the sealed crustless sandwich 10 as shown in FIG. 2 of the drawings. After the sealed crustless sandwich 10 is removed from the cutting cylinder 40 and sleeve 42, the air tight resilient packaging 14 is applied around it for preserving the sealed crustless sandwich.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A sealed crustless sandwich, comprising:

a first bread layer having a first perimeter surface coplanar to a contact surface;

at least one filling of an edible food juxtaposed to said contact surface;

a second bread layer juxtaposed to said at least one filling opposite of said first bread layer, wherein said second bread layer includes a second perimeter surface similar to said first perimeter surface;

a crimped edge directly between said first perimeter surface and said second perimeter surface for sealing said at least one filling between said first bread layer and said second bread layer;

wherein a crust portion of said first bread layer and said second bread layer has been removed.

2. The sealed crustless sandwich of claim 1, wherein said crimped edge includes a plurality of spaced apart depressions for increasing a bond of said crimped edge.

3. The sealed crustless sandwich of claim 2, wherein said crimped edge is a finite distance from said at least one filling for increasing said bond.

4. The sealed crustless sandwich of claim 3, wherein said at least one filling comprises:

a first filling;

a second filling;

a third filling; and wherein said second filling is completely surrounded by said first filling and said third filling for preventing said second filling from engaging said first bread layer and said second bread layer.

5. The sealed crustless sandwich of claim 4, wherein said first filling and third filling have sealing characteristics.

6. The sealed crustless sandwich of claim 5, wherein:

said first filling is juxtaposed to said first bread layer;

said third filling is juxtaposed to said second bread layer; and an outer edge of said first filling and said third filling are engaged to one another to form a reservoir for retaining said second filling in between.

7. The sealed crustless sandwich of claim 6, wherein said first filling and said third filling are comprised of peanut butter; and said second filling is comprised of a jelly.

8. The sealed crustless sandwich of claim 7, wherein said crimped edge is formed into a substantially circular shape.

9. A sealed crustless sandwich, comprising:

a first bread layer having a first perimeter surface, a first crust portion and a first contact surface;

a first filling juxtaposed to said first contact surface;

a second bread layer having a second perimeter surface, a second crust portion and a second contact surface;

a second filling juxtaposed to said second contact surface;

a third filling;

a crimped edge directly between said first and second perimeter surfaces for sealing said first, second, and third fillings between said first and second bread layers;

wherein said first and second crust portions have been removed and said third filling is encapsulated by said first and second fillings.

10. The sealed crustless sandwich of claim 9 wherein said first filling and said second filling have sealing characteristics.

* * * * *

(12) EX PARTE REEXAMINATION CERTIFICATE (5899th)
United States Patent
Kretchman et al.

(10) Number: US 6,004,596 C1
(45) Certificate Issued: Sep. 25, 2007

(54) SEALED CRUSTLESS SANDWICH

(75) Inventors: Len C. Kretchman, Fergus Falls, MN (US); David Geske, Fargo, ND (US)

(73) Assignee: Menusaver, Inc., Orrville, OH (US)

Reexamination Request:
No. 90/005,949, Mar. 9, 2001

Reexamination Certificate for:
Patent No.: 6,004,596
Issued: Dec. 21, 1999
Appl. No.: 08/986,581
Filed: Dec. 8, 1997

(51) Int. Cl.
*A21C 15/00* (2006.01)
*A21C 15/02* (2006.01)
*A21D 13/00* (2006.01)

(52) U.S. Cl. .......................... 426/94; 426/274; 426/275; 426/297

(58) Field of Classification Search .................. None
See application file for complete search history.

(56) References Cited

U.S. PATENT DOCUMENTS

| | | | |
|---|---|---|---|
| 2,765,755 A | 10/1956 | Napolillo | |
| 2,780,163 A | 2/1957 | Lee | |
| 3,083,651 A | 4/1963 | Cooper | |
| 3,095,832 A | 7/1963 | Evans | |
| 3,111,914 A | 11/1963 | Viviano | |
| 3,182,611 A | 5/1965 | Rubenstein | |
| 3,690,898 A | 9/1972 | Partyka | |
| 3,767,823 A | 10/1973 | Wheeler et al. | |
| 3,769,035 A | 10/1973 | Kleiner et al. | |
| 3,782,270 A | 1/1974 | Sollerud | |
| 3,862,344 A | 1/1975 | Zobel | |
| D252,536 S | 8/1979 | Goglanian et al. | |
| 4,163,418 A | 8/1979 | Thelander | |
| 4,382,768 A | 5/1983 | Lifshitz et al. | |
| 4,608,918 A | 9/1986 | Funabashi et al. | |
| D293,040 S | 12/1987 | Gagliardi, Jr. | |
| D317,672 S | 6/1991 | Presl | |
| D318,360 S | 7/1991 | Sam | |
| 5,112,632 A * | 5/1992 | Meli et al. ................... | 426/410 |
| 5,208,059 A | 5/1993 | Dubowik et al. | |
| 5,228,267 A | 7/1993 | Blankenship et al. | |
| 5,387,149 A | 2/1995 | Caveza | |
| 5,500,234 A | 3/1996 | Russo | |
| 5,853,778 A | 12/1998 | Mayfield | |

FOREIGN PATENT DOCUMENTS

AU    A-40334/95    8/1996

OTHER PUBLICATIONS

Selected Excerpts From a Book *Pasta, Pies and Pastries—Tart Recipes From Around the World*, Authored by Ursula Kaiser.
Selected Excerpts From *The Pampered Chef*.
A Recipe and Instruction Book Entitled *The Pampered Chef*.
Attachment D–Cooke Declaration Dated Mar. 15, 2001.

* cited by examiner

*Primary Examiner*—Kiley Stoner

(57) ABSTRACT

A sealed crustless sandwich for providing a convenient sandwich without an outer crust which can be stored for long periods of time without a central filling from leaking outwardly. The sandwich includes a lower bread portion, an upper bread portion, an upper filling and a lower filling between the lower and upper bread portions, a center filling sealed between the upper and lower fillings, and a crimped edge along an outer perimeter of the bread portions for sealing the fillings therebetween. The upper and lower fillings are preferably comprised of peanut butter and the center filling is comprised of at least jelly. The center filling is prevented from radiating outwardly into and through the bread portions from the surrounding peanut butter.

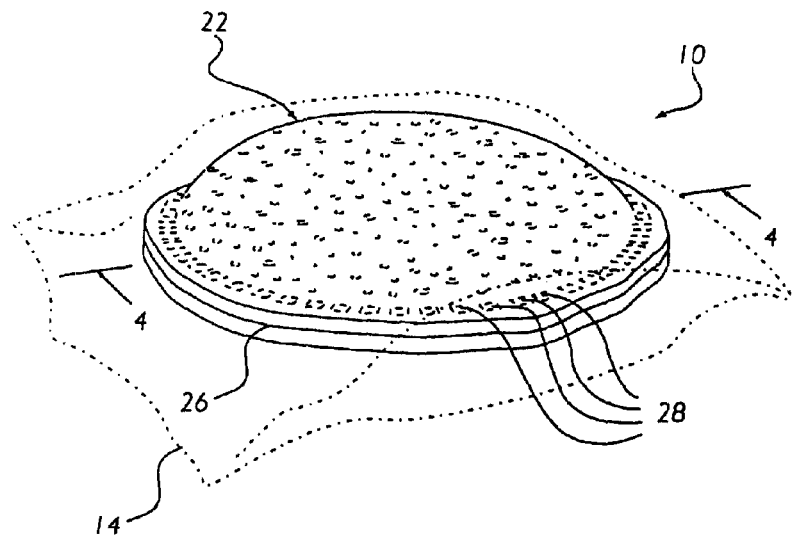

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–10 are cancelled.

* * * * *